M. DE YCAZA.
EGG CARRIER.
APPLICATION FILED MAR. 14, 1919.
1,312,238.
Patented Aug. 5, 1919.
2 SHEETS—SHEET 1.
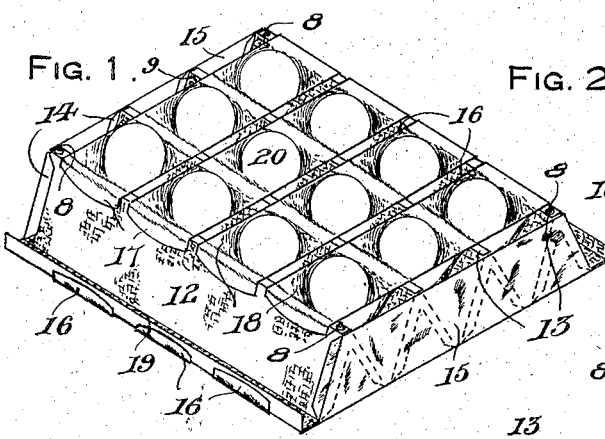
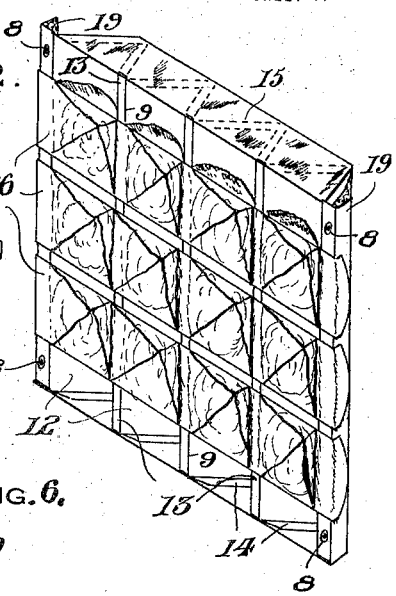
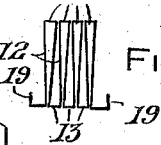
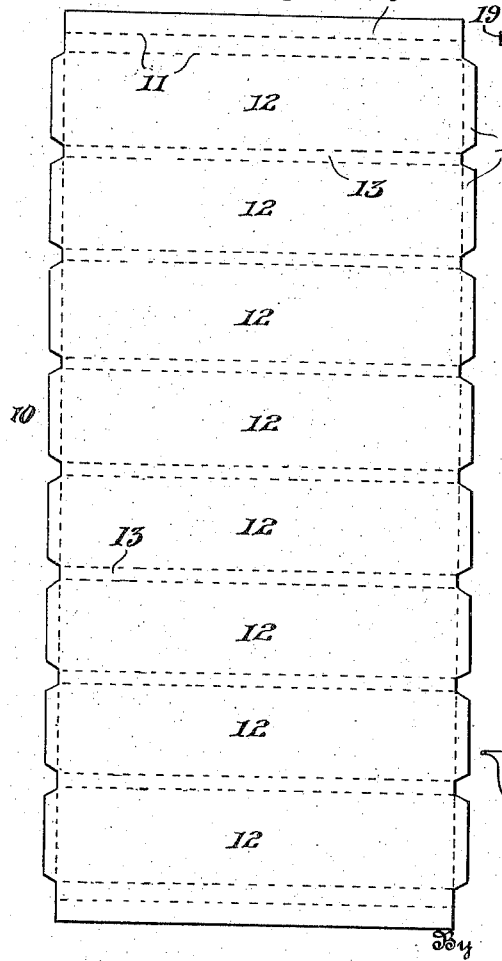
FIG. 9.
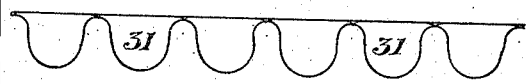
Inventor
M. de Ycaza
By F. K. Bryant
Attorney

M. DE YCAZA.
EGG CARRIER.
APPLICATION FILED MAR. 14, 1919.

1,312,238.

Patented Aug. 5, 1919.
2 SHEETS—SHEET 2.

Inventor
M. de Ycaza
By J. H. Bryant.
Attorney.

THE COLUMBIA PLANOGRAPH CO., WASHINGTON, D. C.

UNITED STATES PATENT OFFICE.

MARIANO DE YCAZA, OF ITHACA, NEW YORK.

EGG-CARRIER.

1,312,238. Specification of Letters Patent. Patented Aug. 5, 1919.

Application filed March 14, 1919. Serial No. 282,597.

*To all whom it may concern:*

Be it known that I, MARIANO DE YCAZA, a subject of the King of Spain, residing at Ithaca, in the county of Tompkins and State of New York, have invented certain new and useful Improvements in Egg-Carriers, of which the following is a specification.

The primary object of the invention is the provision of a carrier for eggs that is light in weight for convenience in shipping eggs by parcel post and then returning the carriers compactly folded for reshipment, the entire structure being easily and inexpensively manufactured.

A further object of the invention is to provide a foldable egg carrier adapted for holding a plurality of eggs in separated relations preventing breakage, the structure being shock-absorbing and possessing great strength and long life whereby the carrier may be used repeatedly.

A still further object of the invention is to provide a carrier for eggs easily and quickly folded and opened when desired, the structure being built up in separate layers for shipping more eggs in a smaller volume, the eggs being separately held in a manner to prevent evaporation of the egg while at all times providing free ventilation for preserving the eggs.

By my form of carrier the separate eggs are swingingly positioned for convenience in handling any desired quantity of eggs, the arrangement permitting the holding of a greater number of eggs than is customary for a given amount of space, the eggs being braced for strength in different directions insuring the safety thereof.

With these general objects in view and others that will appear as the nature of the invention is better understood, the same consists of the novel combination, construction and arrangement of parts hereinafter more fully described, illustrated in the accompanying drawings, and then pointed out in the appended claims.

Figure 4:
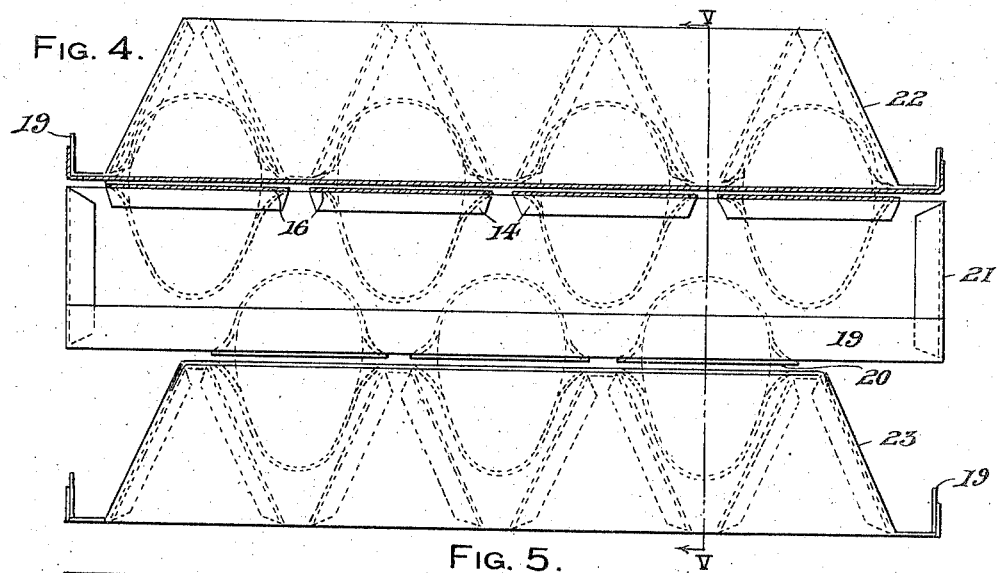
Figure 5:
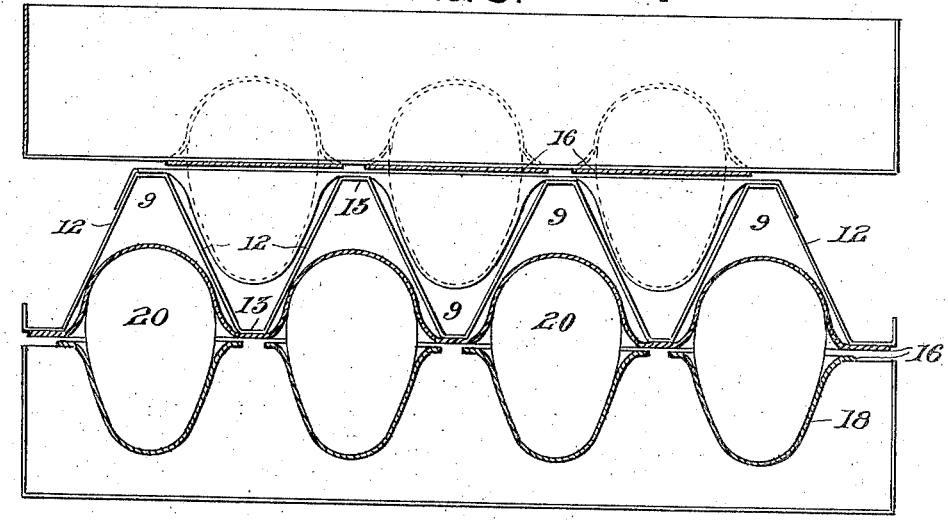

In the drawings forming a part of this application and in which like reference characters designate corresponding parts throughout the several views, Figure 1 is a top perspective view of one frame forming a part of my carrier, Fig. 2 is a bottom perspective view of a similar coöperating frame, Fig. 3 is a developed plan view of a blank adapted to be bent into an egg-carrying frame, Fig. 4 is an elevational view partly in section of three frames arranged for carrying two layers of eggs, Fig. 5 is a transverse sectional view taken upon line V—V of Fig. 4, and Fig. 6 is an end elevation of one of the folded trays.

My invention broadly includes the formation of a tray as best illustrated in Figs. 1 and 2 of the drawings, from a blank 10 illustrated in Fig. 3. Parallel transverse scorings 11 across the blank 10 permit the blank to be bent into a plurality of substantially V-shaped ribs 9, having rectangular sides 12 connected at opposite sides of the tray with ledges or seats 13 positioned in parallel planes at opposite sides of the tray and equally spaced apart for accommodating egg-carrying means hereinafter described between the seats 13 at the opposite sides of the tray.

A flange 14 at the opposite ends of each rib side 12 is adapted for turning inwardly and secured to a flexible end covering 15 at the adjacent end of the tray. The flexible ends 15 may be formed of cloth, paper or similar material so that the ribs are folded together after the manner of a fan when the tray is not in use.

Strips 16 of flexible material such as cloth have overlapping ends 17 attached to the outer faces of the terminal ribs 9 of the tray with sagging pockets 18 between the seats 13 transversely of which the strips 16 are secured. The pocket strips 16 are preferably secured in this manner upon the opposite sides of the trays for accommodating eggs between the ribs 9 at both sides of the tray.

When desired for use, the flanges 19 upon the outer side ribs 12 are grasped and the ribs separated with the tray set up for use ready to receive eggs such as 20 within the pockets 18 thereof. A second tray of identical form is then mounted over the eggs 20 with its pocket strips 16 running perpendicular to the pocket strips of the tray therebeneath. In Figs. 4 and 5 of the drawings, the manner of carrying two layers of eggs is illustrated and in which the intermediate tray 21 is positioned with its pocket strips perpendicular to the pocket strips of the top and bottom trays 22 and 23 respectively. The suspended position of the eggs 20 within the pockets 18 is illustrated, it being apparent that the eggs are fully protected against breakage and are suspended by the strip 16 for taking up and absorbing shocks and jars incident to the transportation of the carrier. When the eggs 20 are removed, the tray is readily collapsed as shown in Fig. 6 of the drawings, a large number of the folded trays taking up but little space and adapted for return shipment in a separate box if desired. It will be apparent that the built-up structure of a plurality of trays may be positioned in a box for shipment, inclosing the eggs 20 and that any desired number of rows or layers may be used. Evaporation of the eggs is prevented by the closely fitting fabric pockets 18 in which the eggs are incased.

While the trays as will be evident may be separately folded, the same are capable of being nested in plurality in their folded positions so that a large number of the cases take up but little room. The strips 16 are provided transversely of the tray at the opposite sides thereof to form pockets 18 opening at one side of the tray and positioned between the pockets opening at the opposite side of the tray. The top of the tray as shown in Fig. 1 of the drawings employs four transeverse strips 16 secured across the upper ribs 13 while the lower side of the tray employs only three strips 16 secured across the lower seats 13 as shown in Fig. 2. The trays being superposed with the pocket strips 16 thereof at right angles to each other, the pockets 18 in the top of one tray coöperates with the pockets in the bottom of the other tray to accommodate and hold the eggs 20. The provision of the strips 16 and pockets 18 upon both sides of all of the trays permits the stacking of the trays when filled with eggs as shown in Figs. 4 and 5. Separable fasteners 8 adjacent the corners of the trays are adapted for engagement when the trays are superposed for retaining the trays together in their outstretched transverse arrangement.

The manner of forming the collapsible trays which make up my carrier has been fully described as well as the manner of use and objects therefor and although the form of the invention is herein set forth and described it will be understood that minor changes may be made therein without departing from the spirit and scope of the invention as claimed.

The material from which the blank 10 is made is preferably cloth covered or a form of cloth card-board as indicated in Fig. 1. This imparts added strength to the tray and reinforces the hinging and bending portions such as those between the rib sides 12 and seats 13, preventing cracking from long use.

What I claim as new is:

1. An egg-carrier comprising a tray formed of folded stiff material having opposite parallel ribs, fabric material secured transversely of said ribs with pockets between the ribs, two of the trays being adapted to be superposed with eggs protectingly inclosed within the pockets.

2. An egg-carrier comprising trays formed of sheet material bent in a plurality of valleys with intermediate ribs, pocket strips spaced apart across said ribs breaking joints upon the opposite sides of the tray whereby the pockets of said strips register with each other when the trays are superposed with the ribs of the trays in perpendicular relations.

3. A tray formed of stiff material bent into successive V-shaped portions having parallel ribs at opposite sides of the tray, flexible strips mounted transversely across said ribs at one side of the tray forming receiving pockets in said V-shaped portions.

4. A tray formed of stiff material bent into successive V-shaped portions having parallel ribs at opposite sides of the tray, flexible strips mounted transversely across said ribs at one side of the tray forming receiving pockets in said V-shaped portions, a different number of strips at the opposite sides of the tray out of alinement with the aforementioned strips and provided with separate pockets at one side of the tray and flexible end members for the tray adapted for permittting the folding of the latter with the strips in said V-shaped portions.

5. An egg-carrier comprising trays formed of sheet material bent in a plurality of valleys with intermediate ribs, pocket strips spaced apart across said ribs breaking joints upon the opposite sides of the tray whereby the pockets of said strips register with each other when the trays are superposed with their ribs in perpendicular relations, and separable fasteners adjacent the corners of the trays adapted for maintaining the trays assembled in transverse superposed relation with eggs in the said pockets.

In testimony whereof I affix my signature.

MARIANO DE YCAZA.

Copies of this patent may be obtained for five cents each, by addressing the "Commissioner of Patents, Washington, D. C."